Patented Dec. 16, 1930

1,785,635

UNITED STATES PATENT OFFICE

NIKOLAUS LEBEDENKO, OF BERLIN-WILMERSDORF, GERMANY

METHOD OF MANUFACTURE OF PHOTOGRAPHIC PICTURES ON CHROMATED GEL-LAYERS

No Drawing. Application filed April 28, 1928, Serial No. 273,773, and in Germany May 4, 1927.

This invention relates to the manufacture of photographic images on chromated gel-layers wherein the details are clearly recorded in the light as well as in the dark portions of the image and which require for their manufacture only a short exposure of say $\frac{1}{5}$ to $\frac{1}{4}$ second.

The invention comprises the treatment of the gel-layers, sensitized with bichromate and subjected to exposure so as to form thereon a latent image, with a vapor atmosphere supersaturated with steam, that is to say, containing the steam in a somewhat nebulous form and having a temperature of preferably below 40° C. The vapor atmosphere may contain a certain limited amount of a weak volatile acid, preferably an acid of organic nature such as acetic acid or, if desired, carbonic acid. The treatment of the gel-layer with such vapor atmosphere completes the hardening of the gel-layer which had been initiated by the light exposure without the least halo-effect such as is often observed in connection with a treatment of the gel-layer in a water bath. The treatment with the vapor atmosphere further assists the recording of the details particularly in the light portions of the picture. This applies particularly in the case where gel-layers are used which are sensitized by a highly concentrated bichromate solution, for instance a solution of a concentration of 3 to 10%. Such a sensitizing method requires, however, that the layer, after being treated within the sensitizing bath, be subjected in still wet condition to a short additional treatment in pure water or in a weak sensitizing solution of not more than 2% concentration as explained in my copending application Serial No. 242,957, filed December 27, 1927.

The exposure of the gel-layer for printing an image thereon effects by decomposition of the bichromate salt the formation of chromic dioxide which becomes visible by appearance of a brownish image which again disappears when the layer is subjected to the treatment with the vapor atmosphere oversaturated with steam. The disappearance of the brownish image indicates that a suitable degree of treatment with the vapor atmosphere is reached.

The gel-layers having been subjected to the treatment with the vapor atmosphere can be washed in cold water for removing the sensitizing salt which has not been decomposed, and thereafter stained in wet or dry condition as usual.

It is however advisable to connect the vapor atmosphere treatment with an additional uniform exposure to light whereby, depending upon the manner in which it is made, several valuable effects are obtained.

The gel-layer, after exposure for printing an image thereon absorbs in its different portions during the treatment with the vapor atmosphere oversaturated with steam different quantities of water depending upon the quantity of actinic light impinged thereon, and the light sensitiveness of the layer is thereby decreased depending upon the quantity of absorbed water so that the light portions remain broadly light sensitive whereas the deep shadows completely lose their light sensitiveness by strong absorption of water and in this way become highly adapted for being impregnated with dyeing material later on. Therefore the additional uniform light exposure of the gel-layer carrying the latent image, if effected from the image side, in combination with the treatment with the vapor atmosphere oversaturated with steam has the effect of improving the recording of details in all half-tone portions.

In order to avoid producing a decomposition of the sensitizing salt in the deep shadows by the said uniform light exposure after the printing exposure producing the latent image on the gel-layer, such deep shadows at the beginning of the uniform light exposure must already have lost their light sensitiveness by absorption of water during the treatment with the vapor atmosphere. The uniform light exposure therefore should only be made at a time when the treatment with the vapor atmosphere has already begun with exclusion of light. Experience has shown that the effect of the treatment with the vapor atmosphere in the deep shadows is secured so quickly that 5–10 seconds of such vapor atmosphere treatment in the dark are completely sufficient in order to secure the desired effect and that even simultaneous starting of the vapor atmosphere treatment and of the uniform light exposure yields satisfactory results.

The uniform light exposure in connection with the treatment of the gel-layer with the latent image thereon does not need to be limited to a treatment from the front side. Indeed a uniform light exposure from the back side has the further valuable effect that the gel-layer at those portions, which are adjacent the carrying support, is hardened, whereby the physical condition of the image carrying layer is insofar favorably influenced as the surface does not wrinkle so as to assume a somewhat grain-like structure if observed with a magnifying glass, as it usually does in connection with known methods. This effect can also be secured if the uniform light exposure from the back side is effected at any time prior to the treatment of the layer with the vapor atmosphere oversaturated with steam.

The effect of avoiding the wrinkling of the free surface of the gel-layer by a uniform light exposure of the layer from the back side through the support also takes place if the layer carrying the latent image is not subjected to a treatment with a vapor atmosphere oversaturated with steam and if the layer after having been subjected to the printing exposure is washed at once with cold water. As to the uniform light exposure of the layer from the back side its intensity and duration must fulfill the condition that the solubility and hardness of the material at the free surface of the gel-layer is not affected thereby, but that on the contrary the effect of the uniform light exposure from the back side is limited to those portions of the gel-layer which are positioned below the free surface, so as to retain unchanged the capacity of the free surface of the gel-layer to absorb dyeing material.

It may be mentioned that at all places where in the above specification a uniform light exposure has been mentioned such exposure of the gel-layer to light is understood whereby each point of the free or of the bottom surface of the layer is acted on by the same quantity of actinic light.

What I claim is:—

1. Method of manufacturing a photographic picture on a chromated gel-layer comprising exposing the layer and subjecting the exposed layer to a treatment with a vapor atmosphere oversaturated with steam followed by the usual washing and staining treatments.

2. Method according to claim 1 comprising the treatment of the exposed gel-layer with a vapor atmosphere oversaturated with steam containing a weak volatile acid.

3. In a method of manufacturing a photographic picture the step of subjecting the latent image carrying layer to a treatment with a vapor atmosphere oversaturated with steam in combination with an additional uniform light exposure.

4. Method according to claim 3 wherein the additional uniform light exposure is made only after a short vapor treatment with exclusion of light.

5. Method according to claim 3 wherein the gel-layer is subjected to the uniform light exposure from the front as well as from the back side.

6. Method of manufacturing a photographic picture comprising treating a gel-layer with a bichromate solution of high concentration up to 10%, subjecting it thereafter to an additional treatment with an aqueous liquid adapted to dissolve superficially deposited bichromate salt from the layer, drying the layer, subjecting it to an image producing exposure, treating the surface of the layer carrying the latent image with a vapor atmosphere oversaturated with steam and subjecting the layer to the usual final washing and staining treatment.

In testimony whereof, I affix my signature.

NIKOLAUS LEBEDENKO, Eng.